United States Patent
Newell

(10) Patent No.: US 8,869,224 B2
(45) Date of Patent: Oct. 21, 2014

(54) ADDRESSABLE ACCOUNT COMMANDS

(75) Inventor: Nicholas B. Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1116 days.

(21) Appl. No.: 12/500,224

(22) Filed: Jul. 9, 2009

(65) Prior Publication Data

US 2011/0010735 A1    Jan. 13, 2011

(51) Int. Cl.
   H04N 7/173       (2011.01)
   H04N 21/426      (2011.01)
   H04N 21/443      (2011.01)
   H04N 7/20        (2006.01)
   H04N 21/81       (2011.01)

(52) U.S. Cl.
   CPC ........... H04N 7/20 (2013.01); H04N 21/42684 (2013.01); H04N 21/443 (2013.01); H04N 21/8166 (2013.01)
   USPC .......................................... 725/132; 725/100

(58) Field of Classification Search
   None
   See application file for complete search history.

(56) References Cited

U.S. PATENT DOCUMENTS

| 5,619,274 | A  | * | 4/1997  | Roop et al. ........... 348/461 |
| 6,882,729 | B2 | * | 4/2005  | Arling et al. ......... 380/274 |
| 7,239,704 | B1 | * | 7/2007  | Maillard et al. ...... 380/210 |
| 2003/0139980 | A1 | * | 7/2003  | Hamilton ............... 705/27 |
| 2005/0229212 | A1 | * | 10/2005 | Kuether et al. ........ 725/58 |

* cited by examiner

*Primary Examiner* — Mark D Featherstone
(74) *Attorney, Agent, or Firm* — Ingrassia Fisher & Lorenz, P.C.

(57) ABSTRACT

One embodiment takes the form of an apparatus or method for generating and transmitting distribution system commands addressed by a general identification, such as a customer-specific identification. The general identification may take the form of a customer number or any other identifier unique to a customer account. The identifier may be stored in the computer-readable memory of several or all of the set-top boxes associated with a particular customer such that commands addressed with the unique identifier may be decrypted and executed by the set-top boxes. Thus, a single command addressed with the customer identification may be received and executed by several or all of the set-top boxes for a particular customer without the need for addressing the command to each set-top box individually.

18 Claims, 4 Drawing Sheets

US 8,869,224 B2

ADDRESSABLE ACCOUNT COMMANDS

TECHNICAL FIELD

The present invention relates generally to satellite distribution systems, and more particularly to generating a common addressable command from an account or customer-specific number such that a command may be addressed to several satellite television receivers associated with the same account or customer.

BACKGROUND

A satellite or digital cable distribution system may provide television programs to subscribers of the distribution system. Typically, satellite and digital cable distribution systems include a set-top box that receives and decrypts the television signal such that a television program may be viewed by the user. In many satellite distribution systems, the television signal may be broadcast by a satellite, received by a satellite dish antenna and decoded by the set-top box. In digital cable systems, the television signal is typically transmitted to the user through a cable connected directly to the set-top box.

Generally, set-top boxes connected to a distribution system may receive commands from a satellite via the distribution system, to configure and/or update the operating software or access privileges stored in the set-top box. For example, upon purchase by a user, a headend of the distribution system may transmit a command to a user's set-top box to provide the user's system with access to purchased content, such as a pay-per-view movie or channel. This command typically includes instructions to the set-top box's software to unlock the content or other instructions and is often addressed or encrypted to a unique smart card associated with the set-top box. Further, in most systems, only the specific smart card to which the command is addressed may decrypt the command. Thus, by request of a user, a command may be broadcast across the distribution system to several set-top boxes of the system simultaneously such that only the set-top box with a matching smart card number to the encrypted command may decrypt and execute the command.

BRIEF SUMMARY

It is typical for a customer of a satellite or digital cable distribution system to have more than one set-top box associated with the customer's account. For example, a customer may have one set-top box located in a first location within the customer's house and another set-top box located in a second location within the house. To identify each separate set-top box on the network, each set-top box associated with the customer's account has its own unique smart card identification. However, customers typically prefer that purchased content be available on each set-top box associated with the customer. For example, a customer wishing to subscribe to a pay movie channel, such as "HBO™", prefers to have such content available on each set-top box associated with the customer's account.

Typically, to provide such content to the customer, the distribution system must transmit a command to add the channel; this command is usually addressed to each of the customer's set-top boxes, as identified by that box's smart card identification number. Thus, continuing the above example, a first command unlocking the channel must be addressed to the smart card associated with the set-top box located in the first location in the house and an additional command must be addressed to the smart card associated with the set-top box located in the second location. Accordingly, a method and system for addressing a single command such that each set-top associated with a customer's account receives and executes the command, without the need to provide separate commands individually addressed to each set-top box may be useful.

One embodiment may take the form of a method for providing data to a receiver. The method may include the operations of providing a unique customer identification number to a first set-top box associated with a customer's account and receiving a request command. The request command may be provided in response to a request by a customer. The method may also include the operations of generating a configuration command from the request command, addressing the configuration command with the customer identification number and transmitting the customer-addressed configuration command to the first set-top box.

A second embodiment may take the form of a method for configuring a receiver. The method may include the operation of receiving a customer identification number from a provider source. The customer identification number may be indicative of an account associated with a customer. Other operations of the method may include filtering incoming command messages for a customer-addressed command message, with the customer-addressed command message addressed with the customer identification number and executing the customer-addressed command message to configure the receiver.

A third embodiment may take the form of a system for providing data to a plurality of receivers. The system may include a provider source configured to provide a customer identification number and a request command in response to a request from a user. The system may also include a command generation module configured to receive the customer identification number and the request command. The command generation module may further be configured to generate a configuration command in response to the request command and addressed with the customer identification number. The system may also include a first receiver configured to receive the configuration command, the first receiver further configured to execute the configuration command.

DETAILED DESCRIPTION

One embodiment takes the form of an apparatus or method for generating and transmitting distribution system commands addressed by a general identification, such as a customer-specific identification. The general identification may take the form of a customer number or any other identifier unique to a customer account. Thus, although customer number is used herein, the identifier may be any general identification such that one or more set-top boxes of the distribution system may receive and execute the command.

The identifier may be stored in the computer-readable memory of one or more set-top boxes associated with a particular customer such that commands addressed with the unique identifier may be decrypted and executed by the set-top boxes. Thus, a single command addressed with the customer identification may be received and executed by several or all of the set-top boxes for a particular customer without the need for addressing the command to each set-top box individually. In this manner, redundant throughput and bandwidth of the distribution system are reduced as several set-top boxes may execute a single command transmitted over the distribution system. Further, less bandwidth consumption of the distribution system may allow for better quality on existing channels as those channels are now free to transmit the multimedia content.

Figure 1:
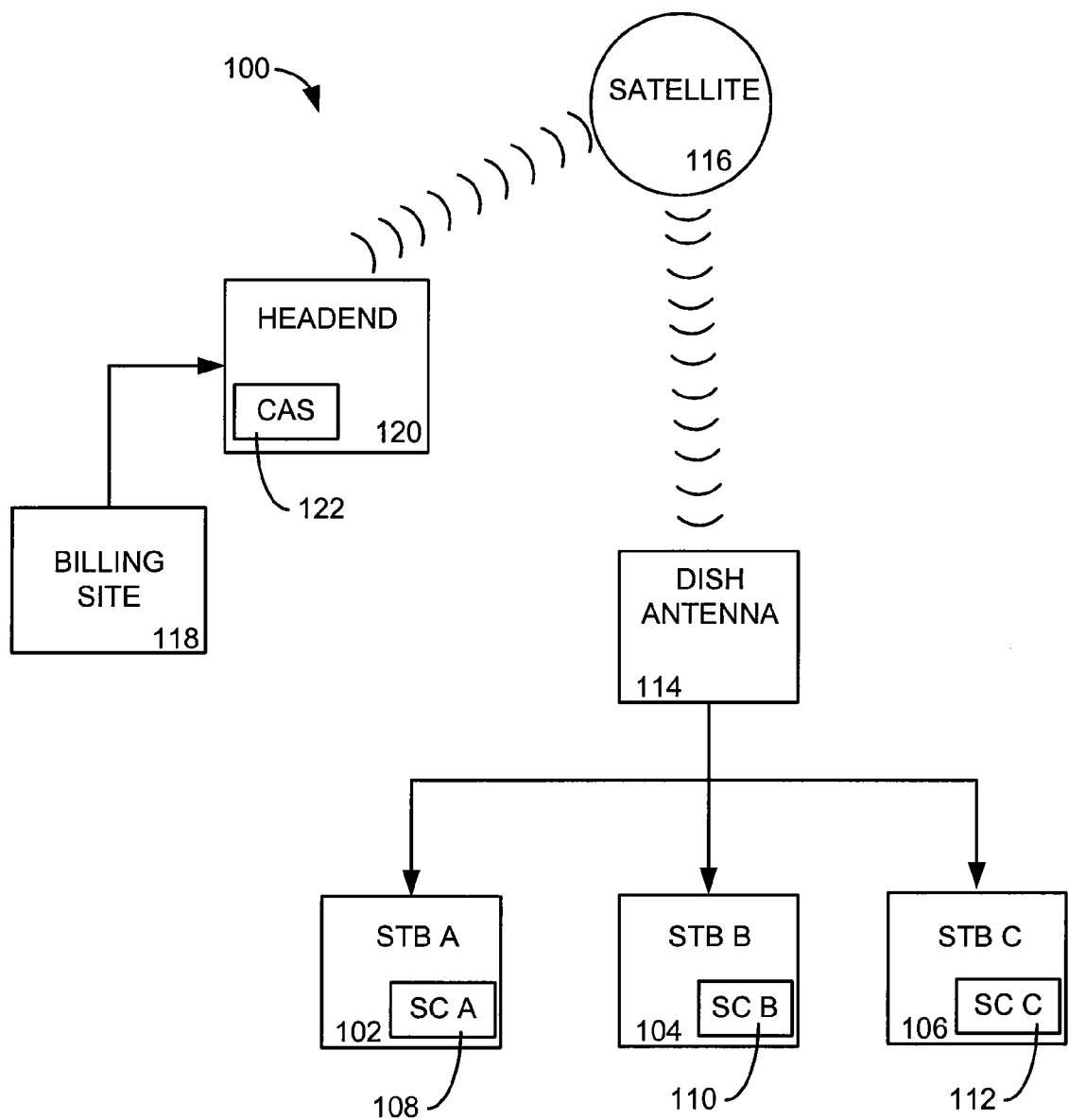
FIG. 1 depicts a first embodiment of a satellite distribution system utilizing a customer-specific identification to address commands to one or more set-top boxes.

FIG. 1 depicts a first embodiment of a satellite distribution system 100 utilizing customer-specific addressed commands. This embodiment may allow a distribution system 100 to provide a single configuration command to several set-top boxes 102-106, each associated with a customer account, without the need to provide several commands addressed to each set-top box individually. The system 100 of FIG. 1 is but one example of a distribution system that may implement the methods of the present disclosure.

As described above, one or more set-top boxes (STBs) 102-106 may receive a signal transmitted across the distribution system from a television provider and convert it into a signal that the user's television may recognize and display. In the embodiment of FIG. 1, three STBs are shown, namely STB A 102, STB B 104 and STB C 106. Generally, an "STB," as used herein, encompasses any type of device that may convert a television signal into a usable signal for a user's television. To receive the television signal from the television provider, each STB 102-106 may be connected to a single satellite dish antenna 114 that receives a signal from a satellite 116. Alternatively, each STB 102-106 may be connected to separate antennas to receive information and content from the television provider.

Each STB 102-106 may also include or otherwise be associated with a smart card 108-112. For example, STB A 102 is associated with smart card A 108, STB B 104 is associated with smart card B 110 and STB C 106 is associated with smart card C 112. The smart cards 108-112 include a unique identifier and may be used by the distribution system to identify the STBs 102-106. For example, smart card A 108 may store a unique identifier, such as a smart card identification (ID) number. The smart card ID number may be used by the distribution system 100 to identify the STB A 102 and differentiate STB A 102 from every other STB in the distribution system. Further, messages sent across the distribution system 100 may be encrypted with a smart card 108-112 number such that only a STB 102-106 with that particular smart card may decrypt and read the message.

As shown in FIG. 1, the distribution system 100 may include a billing site 118 that may be maintained by either the television provider or a third party to perform the billing activities of the system. The billing site 118 may be used by the distribution system 100 to track billing and provide billing statements to the customers of the system. Furthermore, the billing site 118 may also create, store and provide customer information to the distribution system 100. For example, the billing site 118 may create a customer ID number for each customer billing address. This ID number may be provided to the distribution system 100 by the billing site 118 through a headend 120 associated with the distribution system. The billing site 118 may also link or otherwise associate several smart card numbers that may be assigned to a single customer to that customer's ID number. For example, a customer may have several STBs 102-106 associated with his account. Each STB 102-106 may be assigned a STB identifier (such as a smart card ID number) to uniquely identify the STB 102-106 to the distribution system as described above. In cases where the customer may have several STBs 102-106 associated with the account, the billing site 118 may link the smart card ID number of each STB associated with the user to the user's customer ID number. In this manner, the billing site 118 may maintain an index of each STB 102-106 associated with each customer account.

Any customer information that may be needed by the distribution system 100 may be created and stored by the billing site 118. Alternatively, other components of the distribution system 100 may create and/or store the customer information provided by the billing site 118 in a database. The distribution system 100 may then access the database containing information about each customer of the distribution system when needed. In another embodiment, the headend 120 may act as the billing site and create and store the customer information described above.

As further shown in FIG. 1, the headend 120 may be included in the distribution system 100. The headend 120 may be a master facility that receives television signals for processing and distribution to various distribution systems. For example, a satellite television provider headend 120 may receive television programs from the program producers. After receiving the programs, the headend 120 may process the programs (or other audio/visual presentations) to place them in a transmission format suitable for broadcast to subscribers. In a satellite television provider, the headend 120 may transmit the audio/visual signal to a satellite for redistribution to subscribers. In a cable distribution system provider, the headend 120 may transmit the television signal directly to the STBs 102-106 of the users over a cable network. Some content delivery systems may include several headends located throughout the network, each serving a subset of subscribers.

The headend 120 may also include a conditional access system (CAS) 122. The CAS 122 may be associated with the headend 120 and may generate commands to be sent to the STBs. For example, in a satellite distribution system 100, the CAS 122 may convert the customer ID information provided by the billing site 118 into an encrypted signal that may be broadcast to the satellite 116 and rebroadcast from the satellite to the STBs 102-106 of the user. In this manner, the CAS 122 may prepare a signal that may be transmitted through the distribution system 100 to communicate with any STB 102-106 in the system.

In an alternative embodiment of the distribution system, the STBs 102-106 may be directly connected to the headend 120 through a cable or network connection. Information and content provided to the STBs 102-106 may be sent over the cable connections, rather than through a satellite system. The cable or network connection may include, but is not limited to, an Ethernet connection, a coaxial connection, or a typical phone line. Generally, any transmission medium may be used to provide the generated signal to the STBs 102-106 may be used. Further, it is not required that the STBs 102-106 be connected directly to the headend 120 to receive the generated signal. Rather, the STBs 102-106 may connect to the headend 120 through a series of connections maintained within a network, such as a WAN or the internet.

Figure 2A:
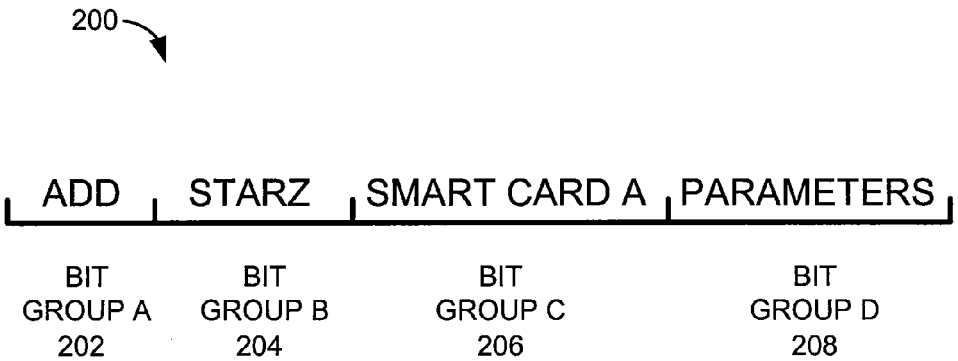
FIG. 2A depicts a command header for a command addressed using a smart card identification.

FIG. 2A depicts a command header for a distribution system command addressed by a smart card identification. The command header 200 may be attached to a command sent to a STB from the distribution system 100 to configure the operating software of the STB or achieve other functionality. For example, the command may be sent to the STB to update the software of the STB, to instruct the STB to allow certain purchased content to be viewed by a user, or to provide system information for local storage by the STB. Generally, any information provided to the STB by the distribution system may be considered a "command" as used herein.

Referring back to FIG. 1, commands may be provided to a STB 102 through the distribution system 100. In one example, a user may desire to receive an additional television channel from the system 100. To provide the additional channel, the billing site 118 may provide the request to add the new channel by providing an "add" request to the headend 120. Utilizing the CAS 122, the headend 120 may create and encrypt a command intended for the user's STB 102 instructing the STB to provide the purchased channel. Once the command is created and encrypted by the CAS 122, the headend 120 may broadcast that command to the satellite 116, which in turn may then rebroadcast the command to STB A 102, through the dish antenna 114. Upon receipt, STB A 102 may decrypt the command using smart card A 108 and may execute the command to add the requested channel. In this manner, the distribution system 100 may provide commands to the various STBs located within the system to configure the STBs for each customer accordingly.

Figure 2B:
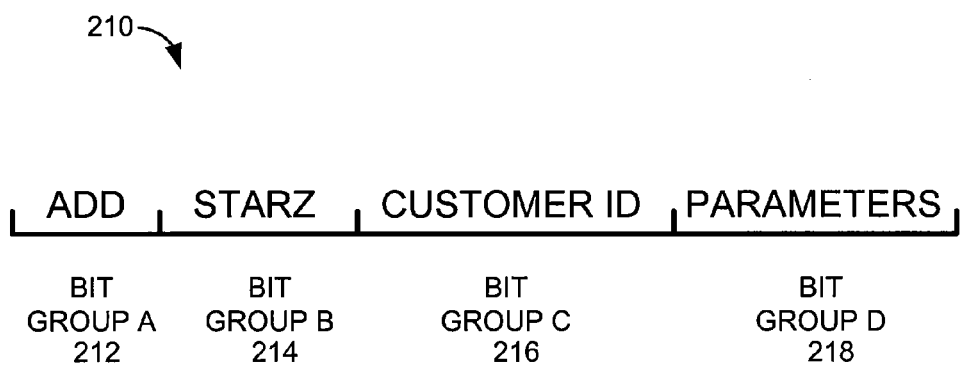
FIG. 2B depicts a command header for a command addressed using a customer identification.

As mentioned, the command header 200 may be attached to the command by the CAS 122 before being transmitted to STB A 102. In the embodiment of FIG. 2A, the command header 200 may be comprised of several groups of bits representing information to be provided to STB A 102 to deliver and execute the command. The bit groups may include any number of bits to provide information to STB A 102. However, for convenience, the bit groups shown in FIGS. 2A and 2B are summarized by the information stored in each bit group, i.e. "Add" for bit group A 202 may be a series of bits providing the add command to the STB A 102. It should be appreciated, however, that the bit groups 202-208 represent binary bits of the command header 200.

The command header 200 may include four bit groups, with each bit representing information to assist STB A 102 in executing the command. Bit group A 202 may instruct STB A 102 to add content to the available channels of the STB. Bit group B 204 may identify the content to be added by the command, in this example, the pay channel "Starz™." Bit group C 206 may identify an address to which the command is transmitted. In this embodiment, the command is addressed to smart card A 108 of STB A 102. Bit group D 208 may provide other parameters that may be used by STB A 102 to execute the command.

The bit groups 202-208 of the command header 200 may include any information that assists a STB in executing the command. For example, bit group A 202, among other things, may instruct the STB to remove a channel from the available channels to the user, to unlock restricted content such as a pay-per-view movie, update the operating software of STB A 102, etc. Bit group B 204 may include an identifier of any content provided by the distribution system. For example, bit group B 204 may include a channel name, a channel number, a content name, or any other identifier of the content. Bit group D 208 may include information to aid in the execution of the command. For example, in an add command, bit group D 208 may include an indication of the date the content is to be available to the user, the date the added content will end and the purchase date of the new content.

In this embodiment, command header 200 indicates that the command is to be transmitted to and executed by STB A 102 because it incorporates the smart card ID of smart card A 108. However, users of distribution systems often prefer that each STB associated with that user include the same available content. Thus, to provide the requested content to each STB on a customer's account, the add command illustrated in FIG. 2A must be provided to each STB associated with that user. For example, STB B 104 and STB C 106 of FIG. 1 may also be associated with the customer of STB A 102. To add the purchased channel to STB B 104 and STB C 106, two more commands may be generated by the CAS 122. The second generated command may be similar to the command illustrated in FIG. 2A, except that bit group C 206 may include the address for the smart card ID for smart card B 110. Similarly, a third command may utilize bit group C 206 to address the command to the smart card ID of smart card C 112. Thus, for any command provided to the STB A 102 in response to a request by the user, similar commands may also be required to provide the same available content for STB B 104 and STB C 106.

FIG. 2B provides an alternate addressing scheme for commands provided by a distribution system. The command header 210 of FIG. 2B may be addressed using a customer identification, rather than the smart card ID. By addressing the commands to a customer ID rather than the smart card ID, a single command may be generated by the CAS and executed by one or more STBs associated with a particular user. As fewer commands are needed to perform the same tasks, addressing commands with a customer ID may reduce bandwidth and throughput of the distribution system command delivery.

Similar to the command header of FIG. 2A, the command header 210 may include bit group A 212 containing command instructions ("ADD"), bit group B 214 containing an identifier of the command content ("STARZ"), bit group C 216 containing an address for the command and bit group D 218 containing parameters for the command. Bit groups A, B and D of command header 210 may contain the same information as the corresponding bit groups of command header 200 depicted in FIG. 2A.

To address the command header 210 to a user's account rather than to a specific STB, however, bit group C 216 of the command header may include an identifier of the customer's account. For example, bit group C 216 may include a customer ID number that identifies a particular customer. By addressing the command header 210 to a customer ID number rather than a smart card number, a single command may be generated and broadcast to each STB associated with a customer's account. As explained in more detail below, each STB associated with a customer's account may filter incoming messages for those that are addressed using the customer's ID number. Thus, each STB associated with the customer's account may recognize the commands addressed to that customer's ID number and execute the command accordingly. It should be appreciated that the "customer ID number" may be an account number or any character string that uniquely identifies a particular account, customer or group of STBs.

Figure 3:
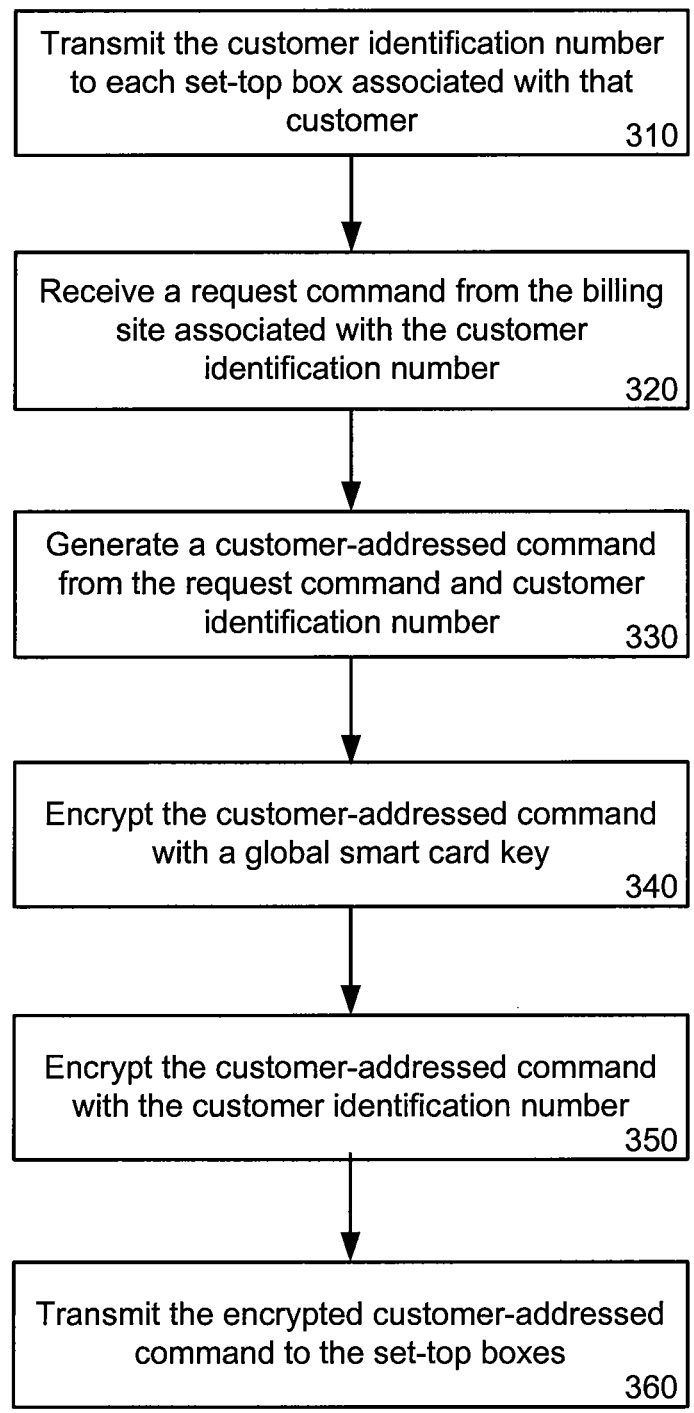
FIG. 3 is a flowchart depicting a method for providing an encrypted customer-specific addressed command to one or more set-top boxes of a distribution system.

FIG. 3 is a flowchart depicting a method for providing an encrypted customer-specific addressed command to one or more set-top boxes of a distribution system. The method may be performed by various components of a television broadcast system to provide a configuration command to one or more STBs of the system addressed to a customer-specific identification number. Generally, the operations of FIG. 3 may be performed by the headend 120 and CAS 118 of the satellite system.

The method may begin in operation 310 by the distribution system transmitting the customer ID number to each STB associated with a user's account. As mentioned above, the billing site 118 may create and maintain a unique customer ID for each customer of the satellite system. In one example, the customer ID may be a 13-digit number. The billing site 118 may provide this number to the headend 120 for each customer of the distribution system.

Once received at the headend 120, the headend transmits the customer ID to the satellite 116, which in turn transmits the customer ID to each STB 102-106 of the distribution system for storage and use in receiving commands addressed to a customer ID. In one example, the CAS 122 may create a command containing the customer ID number and addressed to the smart card 108-112 of each STB 102-106 associated with a customer's account. This command may instruct the STB 102 to store the customer ID number in memory for later use. In this manner, each STB 102-106 associated with a user's account may receive and store the associated customer ID number for use in receiving customer-addressed commands.

Once the STB 102 has received and stored the customer ID, the STB may utilize the customer-addressed commands to reconfigure the STB. In operation 320, a command to configure the STBs associated with a user's account may be received by the headend 120 from the billing site 118. As discussed above, these commands may include such actions as adding an additional channel or content to a user's package, updating the STB software, or to initialize a STB for a new customer. Further, the configuration commands may be addressed by the billing site 118 to a customer's ID number.

After the command is received from the billing site 118, the headend 120 may utilize the CAS 122 to generate a command for transmission to the user's STBs in operation 330. In one embodiment, the CAS 122 may generate a command addressed with the customer ID, similar to the command header shown in FIG. 2B. Thus, continuing the above example, the CAS 122 may generate a command to add the new channel and address that command to the customer's unique ID.

Once generated, the CAS 122 may encrypt the command to provide a secure command transmission. In operation 340, the CAS may encrypt the command with a global smart card key. This global smart card key may be an encryption key recognized by each smart card of the distribution system such that each smart card may decrypt a command that has been encrypted with the global key. In operation 350, the CAS 122 may further encrypt the customer-addressed command using the customer identification number as a seed. Thus, the customer-addressed command may be encrypted twice for security, once with a global smart card number and again with the customer ID number as a seed.

In operation 360, the headend 120 may transmit the encrypted command to the STBs 102-106 associated with the customer's account. The transmission of the command may occur over the satellite distribution system 100 by broadcasting the command to the satellite 116 which rebroadcasts the command to the STBs 102-106. In one embodiment, the command may be transmitted to every STB 102-106 associated with the headend 120. In turn, the STBs 102-106 may filter the incoming commands for those commands addressed to the associated customer ID of the STBs.

In one example, a customer may wish to add a new channel to the list of available channels on the customer's STB. The customer may begin the process of receiving the desired channel by contacting the billing site or television provider and requesting the new channel. In response, the billing site 118 may generate a request command to add the new channel and associate that command with the customer's ID number. The billing site 118 may then provide the request command and the customer ID to the headend 120 for generation of the command and transmission to the STBs associated with the user's account. In alternative embodiments, the headend may receive the request command and customer ID from a database maintained by the distribution system, from another component of the system or may generate the request command and ID itself. Once the add command is generated, the headend 120 may transmit the command to a satellite 116 of the distribution system 100, which in turn may transmit the command to the customer's STBs 108-112.

Figure 4:
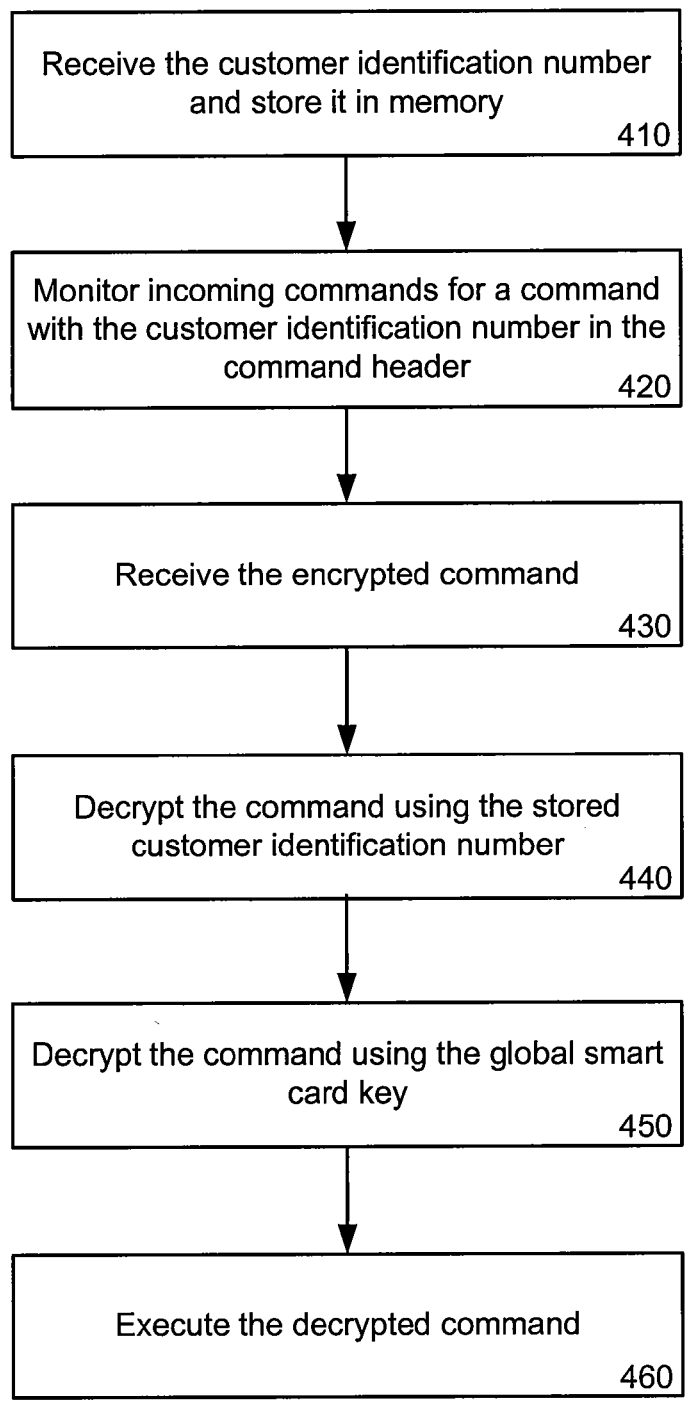
FIG. 4 is a flowchart depicting a method for receiving and executing an encrypted customer-specific addressed command at a set-top box of a distribution system.

FIG. 4 is a flowchart depicting a method for receiving and executing an encrypted customer-addressed command at a set-top box of a distribution system. The operations of FIG. 4 may be performed by one or more STBs of a distribution system.

The method may begin in operation 410 when the STB receives a command from a distribution system that contains a related customer identification number and is addressed to a smart card associated with the STB. The STB may use the unique smart card identifier to determine whether the command is meant for that particular STB. Upon receipt, the STB may remove the customer ID number from the command and store the customer number in a computer-readable memory, such as a non-volatile memory or external hard drive.

In operation 420, the STB may use the stored customer ID number to monitor incoming commands for commands that are intended for that particular STB. For example, the STB may include a filter mechanism at the input of the STB from the distribution system. This filter mechanism may monitor the incoming messages to determine a customer ID number contained in the header of the command. If the customer ID number of the command header matches the customer ID number stored in the memory of the STB, the STB may determine that the command is intended for that STB and accept the command accordingly in operation 430. Otherwise, the STB may ignore a command in which the customer ID number in the command header does not match that of the stored customer ID. In this manner, the STB may accept those commands addressed to the related customer ID number.

As should be appreciated, several STBs may store the same customer ID number and may accept and process a single broadcast command. For example. several STBs may be associated with a single customer account. A customer ID number unique to that account may be provided and stored at each STB by including the customer ID number in a command addressed to the smart card ID of each STB. Once stored, the customer ID number may be utilized by the STBs to filter through the incoming commands to search for a command matching the stored customer ID number. In this manner, several STBs may receive and execute a single command that matches the stored customer ID number, without the need of addressing a command to each STB individually.

As mentioned above with reference to FIG. 3, the command sent to the STB may be encrypted. Thus, in operation 440, the STB may decrypt the command using the stored customer ID number. Further, in operation 450, the STB may also decrypt the command using the global smart card key described above. It should be appreciated that it is not necessary that the transmitted commands be encrypted and decrypted in this manner. Rather, any encryption and decryption methods may be used to offer more security to the transmitted signals. Further, it is not necessary that the commands be encrypted or decrypted at all. Rather, the commands may be transmitted to the STB with no encryption.

Upon receipt of the decrypted command, the STB may execute the command accordingly in operation 460. For example, the command may instruct the STB to allow a particular channel to be viewed on that STB. Because several STBs may store the same customer ID number, this command may be executed on several STBs associated with a single customer account nearly simultaneously. By providing one command to several STBs, bandwidth and throughput of the distribution system is reduced.

It should be noted that the flowcharts of FIGS. 3 and 4 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for reducing commands transmitted over a distribution system comprising:
   providing a unique customer identification number to each set-top box associated with a customer's account;
   receiving a request command, the request command provided in response to a request by a customer;
   generating a configuration command from the request command;
   addressing the configuration command with the customer identification number; and
   transmitting the customer-addressed configuration command to a plurality of set-top boxes that includes the set top boxes associated with the customer's account, wherein only set-top boxes of the plurality of set-top boxes that are associated with the customer identification number execute the customer-address configuration command.

2. The method of claim 1 further comprising: encrypting the configuration command with a global smart card key, wherein the global smart card key is known by a smart card associated with the first set-top box.

3. The method of claim 1 further comprising: encrypting the configuration command with the customer identification number.

4. The method of claim 1 further comprising: retrieving the customer identification number from a billing site.

5. The method of claim 1 wherein the request command is received from a billing site.

6. The method of claim 1 wherein the addressing operation further comprises:
   incorporating the customer identification number into a command header; and
   associating the command header with the configuration command.

7. A method for configuring a receiver comprising:
   receiving a customer identification number from a provider source, the customer identification number indicative of an account associated with a customer and stored in each receiver associated with the account;
   filtering incoming command messages for a customer-addressed command message, the customer-addressed command message addressed with the customer identification number; and
   executing the customer-addressed command message to configure the receiver if the customer identification number is associated with the receiver.

8. The method of claim 7 further comprising: storing the customer identification number in a storage medium.

9. The method of claim 7 further comprising: decrypting the customer-addressed command message with a global smart card key, wherein the global smart card key is known by a smart card associated with the receiver.

10. The method of claim 7 further comprising: decrypting the customer-addressed command message with the customer identification number.

11. The method of claim 7 further comprising:
    retrieving a command header from an incoming command message;
    removing an address from the command header;
    comparing the address with an associated smart card identification number; and
    accepting the incoming command message if the address and the smart card identification number are identical.

12. The method of claim 7 wherein the provider source is a satellite distribution system.

13. The method of claim 8 wherein the filtering operation further comprises:
    retrieving a command header from an incoming command message;
    removing an address from the command header;
    comparing the address with the stored customer identification number; and
    accepting the incoming command message if the address and the stored customer identification number are identical.

14. A system for providing data to a plurality of receivers comprising:
    a headend configured to receive a customer identification number and a request command in response to a request from a user;
    a content access system, implemented by the headend, configured to generate a configuration command in response to the request command and addressed with the customer identification number;
    wherein the headend transmits the configuration command to a plurality of receivers wherein receivers of the plurality of receivers execute the configuration command if the receivers are associated with the customer identification number, wherein the customer identification number is stored in each receiver associated with the user.

15. The system of claim 14 further comprising:
    a satellite configured to receive the configuration command from the content access system and transmit the configuration command to the plurality of receivers.

16. The system of claim 15 wherein the content access system is further configured to:
    generate a first initialization command addressed with a first smart card number, the first smart card number associated with a first receiver of the plurality of receivers that is associated with the customer identification number; and transmit the first initialization command to the satellite.

17. The system of claim 15 wherein the command generation module is further configured to:

generate a second initialization command addressed with a second smart card number, the second smart card number associated with a second receiver of the plurality of receivers that is associated with the customer identification number; and transmit the second initialization command to the satellite.

18. The system of claim 16 wherein the first receiver is further configured to: retrieve the customer identification number from the initialization command; and store the customer identification number in a storage medium.

* * * * *